US008812282B2

(12) United States Patent
Krebs et al.

(10) Patent No.: US 8,812,282 B2
(45) Date of Patent: Aug. 19, 2014

(54) EFFICIENT METHOD FOR INVERSION OF GEOPHYSICAL DATA

(75) Inventors: Jerome R. Krebs, Houston, TX (US); David L. Hinkley, Spring, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 391 days.

(21) Appl. No.: 12/810,721

(22) PCT Filed: Jan. 26, 2009

(86) PCT No.: PCT/US2009/032010
§ 371 (c)(1),
(2), (4) Date: Jun. 25, 2010

(87) PCT Pub. No.: WO2009/117174
PCT Pub. Date: Sep. 24, 2009

(65) Prior Publication Data
US 2011/0000678 A1    Jan. 6, 2011

Related U.S. Application Data

(60) Provisional application No. 61/070,297, filed on Mar. 21, 2008.

(51) Int. Cl.
*G06G 7/48* (2006.01)
*G01V 1/28* (2006.01)
*G01V 1/30* (2006.01)

(52) U.S. Cl.
CPC ............ *G01V 1/301* (2013.01); *G01V 2210/50* (2013.01); *G01V 1/282* (2013.01)
USPC ........................ 703/10; 702/7; 702/9; 702/13

(58) Field of Classification Search
USPC ....................................... 703/10; 702/7, 9, 13
See application file for complete search history.

(56) References Cited

U.S. PATENT DOCUMENTS

| 3,812,457 A | 5/1974 | Weller |
| 4,168,485 A | 9/1979 | Payton et al. |

(Continued)

FOREIGN PATENT DOCUMENTS

WO    WO 2008/042081    4/2008

OTHER PUBLICATIONS

Jing, X. et al., "Encoding Multiple Shot Gathers in Prestack Migration", SEG 2000 Expanded Abstracts, ExxonMobil Research Company.*

(Continued)

*Primary Examiner* — Kamini S Shah
*Assistant Examiner* — Cedric D Johnson
(74) *Attorney, Agent, or Firm* — ExxonMobil Upstream Research Company Law Dept.

(57) ABSTRACT

A method for efficient inversion of measured geophysical data from a subsurface region to prospect for hydrocarbons. Gathers of measured data (40) are encoded (60) using a set of non-equivalent encoding functions (30). Then all data records in each encoded gather that correspond to a single receiver are summed (60), repeating for each receiver to generate a simultaneous encoded gather (80). The method employs iterative, local optimization of a cost function to invert the encoded gathers of simultaneous source data. An adjoint method is used to calculate the gradients of the cost function needed for the local optimization process (100). The inverted data yields a physical properties model (110) of the subsurface region that, after iterative updating, can indicate presence of accumulations of hydrocarbons.

20 Claims, 9 Drawing Sheets

(56) References Cited

U.S. PATENT DOCUMENTS

| | | | |
|---|---|---|---|
| 4,545,039 A | 10/1985 | Savit | |
| 4,562,540 A | 12/1985 | Devaney | |
| 4,594,662 A | 6/1986 | Devaney | |
| 4,686,654 A | 8/1987 | Savit | |
| 4,707,812 A | 11/1987 | Martinez | |
| 4,715,020 A | 12/1987 | Landrum, Jr. | |
| 4,780,856 A | 10/1988 | Becquey | |
| 4,823,326 A | 4/1989 | Ward | |
| 4,953,657 A | 9/1990 | Edington | |
| 5,677,893 A | 10/1997 | de Hoop et al. | |
| 5,717,655 A | 2/1998 | Beasley | |
| 5,721,710 A | 2/1998 | Sallas et al. | |
| 5,798,982 A | 8/1998 | He et al. | |
| 5,838,634 A | 11/1998 | Jones et al. | |
| 5,852,588 A | 12/1998 | de Hoop et al. | |
| 5,878,372 A | 3/1999 | Tabarovsky et al. | |
| 5,924,049 A * | 7/1999 | Beasley et al. | 702/17 |
| 5,999,488 A | 12/1999 | Smith | |
| 6,014,342 A | 1/2000 | Lazaratos | |
| 6,021,094 A * | 2/2000 | Ober et al. | 367/53 |
| 6,028,818 A | 2/2000 | Jeffryes | |
| 6,058,073 A | 5/2000 | VerWest | |
| 6,125,330 A | 9/2000 | Robertson et al. | |
| 6,311,133 B1 | 10/2001 | Lailly et al. | |
| 6,317,695 B1 | 11/2001 | Zhou et al. | |
| 6,327,537 B1 | 12/2001 | Ikelle | |
| 6,374,201 B1 | 4/2002 | Grizon et al. | |
| 6,388,947 B1 | 5/2002 | Washbourne et al. | |
| 6,480,790 B1 | 11/2002 | Calvert et al. | |
| 6,522,973 B1 | 2/2003 | Tonellot et al. | |
| 6,545,944 B2 | 4/2003 | de Kok | |
| 6,549,854 B1 | 4/2003 | Malinverno et al. | |
| 6,574,564 B2 | 6/2003 | Lailly et al. | |
| 6,662,147 B1 | 12/2003 | Fournier et al. | |
| 6,665,615 B2 | 12/2003 | Van Riel et al. | |
| 6,687,619 B2 | 2/2004 | Moerig et al. | |
| 6,687,659 B1 | 2/2004 | Shen | |
| 6,704,245 B2 | 3/2004 | Becquey | |
| 6,714,867 B2 | 3/2004 | Meunier | |
| 6,754,590 B1 | 6/2004 | Moldoveanu | |
| 6,766,256 B2 | 7/2004 | Jeffryes | |
| 6,826,486 B1 | 11/2004 | Malinverno | |
| 6,836,448 B2 | 12/2004 | Robertsson et al. | |
| 6,842,701 B2 | 1/2005 | Moerig et al. | |
| 6,859,734 B2 | 2/2005 | Bednar | |
| 6,865,488 B2 | 3/2005 | Moerig et al. | |
| 6,876,928 B2 | 4/2005 | Van Riel et al. | |
| 6,882,938 B2 | 4/2005 | Vaage et al. | |
| 6,901,333 B2 | 5/2005 | Van Riel et al. | |
| 6,903,999 B2 | 6/2005 | Curtis et al. | |
| 6,944,546 B2 | 9/2005 | Xiao et al. | |
| 6,947,843 B2 | 9/2005 | Fisher et al. | |
| 6,999,880 B2 | 2/2006 | Lee | |
| 7,046,581 B2 | 5/2006 | Calvert | |
| 7,050,356 B2 | 5/2006 | Jeffryes | |
| 7,072,767 B2 | 7/2006 | Routh et al. | |
| 7,092,823 B2 | 8/2006 | Lailly et al. | |
| 7,271,747 B2 | 9/2007 | Baraniuk et al. | |
| 7,373,251 B2 | 5/2008 | Hamman et al. | |
| 7,373,252 B2 | 5/2008 | Sherrill et al. | |
| 7,376,046 B2 | 5/2008 | Jeffryes | |
| 7,584,056 B2 | 9/2009 | Koren | |
| 7,602,670 B2 | 10/2009 | Jeffryes | |
| 7,672,194 B2 | 3/2010 | Jeffryes | |
| 7,715,985 B2 | 5/2010 | Van Manen et al. | |
| 8,121,823 B2 | 2/2012 | Krebs et al. | |
| 2002/0120429 A1 | 8/2002 | Ortoleva | |
| 2004/0010373 A1 * | 1/2004 | Smits et al. | 702/6 |
| 2004/0199330 A1 * | 10/2004 | Routh et al. | 702/14 |
| 2006/0029279 A1 | 2/2006 | Donoho | |
| 2006/0136162 A1 | 6/2006 | Hamman et al. | |
| 2007/0027656 A1 | 2/2007 | Baraniuk et al. | |
| 2007/0203673 A1 * | 8/2007 | Sherrill et al. | 702/189 |
| 2007/0272473 A1 | 11/2007 | Herkenhoff et al. | |
| 2007/0274155 A1 | 11/2007 | Ikelle | |
| 2007/0282535 A1 | 12/2007 | Sirgue et al. | |
| 2008/0175101 A1 | 7/2008 | Saenger et al. | |
| 2008/0189043 A1 * | 8/2008 | Anno et al. | 702/14 |
| 2008/0306692 A1 | 12/2008 | Singer et al. | |
| 2009/0005093 A1 * | 1/2009 | Abubakar et al. | 702/7 |
| 2009/0067041 A1 | 3/2009 | Izumi | |
| 2009/0157367 A1 * | 6/2009 | Meyer et al. | 703/10 |
| 2009/0248308 A1 | 10/2009 | Luling | |

OTHER PUBLICATIONS van Manen, D.J. et al., "Making Waves by Time Reversal", 2005, SEG/Houston Annual Meeting.*

Fallat, Mark R. et al., "Geoacoustic Inversion via Local, Global, and Hybrid Algorithms", Feb. 26, 1999, Acoustical Society of America, 105 (6).*

Tarantola, Albert, "Inversion of Seismic Reflection Data in the Acoustic Approximation", Aug. 1984, Geophysics, vol. 49, No. 8.*

Sarma, P. et al., "Efficient Closed-Loop Production Optimization Under Uncertainty", Jun. 13-16, 2005, SPE Europec/EAGE Annual Conference, Society of Petroleum Engineers.*

Berkhout, A.J. (1992), "Areal Shot Record Technology," *J. of Seismic Exploration* 1, pp. 251-264.

Fallat, M.R. et al. (1999), "Geoacoustic inversion via local, global, and hybrid algorithms," *J. Acoust. Soc. Am.* 105, pp. 3219-3230.

Fichtner, A. et al. (2006), "The adjoint method in seismology I. Theory," *Physics of the Earth and Planetary Interiors* 157, pp. 86-104.

Jing, X. et al. (2000), "Encoding multiple shot gathers in prestack migration," *SEG Int'l. Exposition and 70$^{th}$ Annual Meeting Expanded Abstracts*, pp. 786-789.

Mora, P. (1987), "Nonlinear two-dimensional elastic inversion of multioffset seismic data," *Geophysics*, v. 52, No. 9, pp. 1211-1228.

Romero, L.A. et al. (2000), "Phase encoding of shot records in prestack migration," *Geophysics*, v. 65, No. 2, pp. 426-436.

Sirgue, L. et al. (2004), "Efficient waveform inversion and imaging: A strategy for selecting temporal frequencies," *Geophysics*, v. 69, No. 1, pp. 231-248.

Tarantola, A. (1984), "Inversion of seismic reflection data in the acoustic approximation," *Geophysics*, v. 49, No. 8, pp. 1259-1266.

Tarantola, A. (1988), "Theoretical Background for the Inversion of Seismic Waveforms, Including Elasticity and Attenuation," *Pure and Applied Geophsics*, v. 128, Nos. 1/2, pp. 365-399.

Van Manen, D.J. et al. (2005), "Making wave by time reversal", *SEG Int'l. Exposition and 75$^{th}$ Annual Meeting Expanded Abstracts*, pp. 1763-1766.

Zhang, Y. et al. (2005), "Delayed-shot 3D depth migration," *Geophysics*, v. 70, No. 5, pp. E21-E28.

European Search Report, dated Jul. 2, 2009, EP 08159874.0.

International Search Report and Written Opinion, dated Mar. 3, 2009, PCT/US2009/032010.

* cited by examiner

EFFICIENT METHOD FOR INVERSION OF GEOPHYSICAL DATA

CROSS-REFERENCE TO RELATED APPLICATIONS

This application is the National Stage of International Application No. PCT/US2009/032010, that published as WO 2009/117174, filed 26 Jan. 2009, which claims the benefit of U.S. Provisional Application No. 61/070,297, filed 21 Mar. 2008, and is related to PCT Publication No. WO 2008/042081, published on 10 Apr. 2008, each of which is incorporated herein by reference, in its entirety, for all purposes.

FIELD OF THE INVENTION

The invention relates generally to the field of geophysical prospecting, and more particularly to geophysical data processing. Specifically, the invention is a method for inversion of data acquired from multiple geophysical sources such as seismic sources, involving geophysical simulation that computes the data from many simultaneously-active geophysical sources in one execution of the simulation.

BACKGROUND OF THE INVENTION

Geophysical inversion [1,2] attempts to find a model of subsurface properties that optimally explains observed data and satisfies geological and geophysical constraints. There are a large number of well known methods of geophysical inversion. These well known methods fall into one of two categories, iterative inversion and non-iterative inversion. The following are definitions of what is commonly meant by each of the two categories:

Non-iterative inversion—inversion that is accomplished by assuming some simple background model and updating the model based on the input data. This method does not use the updated model as input to another step of inversion. For the case of seismic data these methods are commonly referred to as imaging, migration, diffraction tomography or Born inversion.

Iterative inversion—inversion involving repetitious improvement of the subsurface properties model such that a model is found that satisfactorily explains the observed data. If the inversion converges, then the final model will better explain the observed data and will more closely approximate the actual subsurface properties. Iterative inversion usually produces a more accurate model than non-iterative inversion, but is much more expensive to compute.

Iterative inversion is generally preferred over non-iterative inversion, because it yields more accurate subsurface parameter models. Unfortunately, iterative inversion is so computationally expensive that it is impractical to apply it to many problems of interest. This high computational expense is the result of the fact that all inversion techniques require many compute intensive simulations. The compute time of any individual simulation is proportional to the number of sources to be inverted, and typically there are large numbers of sources in geophysical data. The problem is exacerbated for iterative inversion, because the number of simulations that must be computed is proportional to the number of iterations in the inversion, and the number of iterations required is typically on the order of hundreds to thousands.

The most commonly employed iterative inversion method employed in geophysics is cost function optimization. Cost function optimization involves iterative minimization or maximization of the value, with respect to the model M, of a cost function S(M) which is a measure of the misfit between the calculated and observed data (this is also sometimes referred to as the objective function), where the calculated data is simulated with a computer using the current geophysical properties model and the physics governing propagation of the source signal in a medium represented by a given geophysical properties model. The simulation computations may be done by any of several numerical methods including but not limited to finite difference, finite element or ray tracing. The simulation computations can be performed in either to frequency or time domain.

Cost function optimization methods are either local or global [3]. Global methods simply involve computing the cost function S(M) for a population of models $\{M_1, M_2, M_3, \ldots\}$ and selecting a set of one or more models from that population that approximately minimize S(M). If further improvement is desired this new selected set of models can then be used as a basis to generate a new population of models that can be again tested relative to the cost function S(M). For global methods each model in the test population can be considered to be an iteration, or at a higher level each set of populations tested can be considered an iteration. Well known global inversion methods include Monte Carlo, simulated annealing, genetic and evolution algorithms.

Unfortunately global optimization methods typically converge extremely slowly and therefore most geophysical inversions are based on local cost function optimization. Algorithm 1 summarizes local cost function optimization.

Algorithm 1

Algorithm for performing local cost function optimization.

1. selecting a starting model,
2. computing the gradient of the cost function S(M) with respect to the parameters that describe the model,
3. searching for an updated model that is a perturbation of the starting model in the negative gradient direction that better explains the observed data.

This procedure is iterated by using the new updated model as the starting model for another gradient search. The process continues until an updated model is found that satisfactorily explains the observed data. Commonly used local cost function inversion methods include gradient search, conjugate gradients and Newton's method. Next, this background information will be explained in somewhat more detail.

Local cost function optimization of seismic data in the acoustic approximation is a common geophysical inversion task, and is generally illustrative of other types of geophysical inversion. When inverting seismic data in the acoustic approximation the cost function can be written as:

$$S(M) = \sum_{g=1}^{N_g} \sum_{r=1}^{N_r} \sum_{t=1}^{N_t} W(\psi_{calc}(M, r, t, w_g) - \psi_{obs}(r, t, w_g)) \tag{1}$$

where:
S=cost function,
M=vector of N parameters, $(m_1, m_2, \ldots m_N)$ describing the subsurface model,
g=gather index,
$w_g$=source function for gather g which is a function of spatial coordinates and time, for a point source this is a delta function of the spatial coordinates,
$N_g$=number of gathers,
r=receiver index within gather, $N_r$=number of receivers in a gather,
t=time sample index within a trace,
$N_t$=number of time samples,
W=minimization criteria function (we usually choose W(x) =$x^2$ which is the least squares (L2) criteria),
$\psi_{calc}$=calculated seismic pressure data from the model M,
$\psi_{obs}$=measured seismic pressure data.

The gathers of seismic data in Equation 1 can be any type of gather that can be simulated in one run of a seismic forward modeling program. Usually the gathers correspond to a seismic shot, although the shots can be more general than point sources. For point sources the gather index g corresponds to the location of individual point sources. For plane wave sources g would correspond to different plane wave propagation directions. This generalized source data, $\psi_{obs}$, can either be acquired in the field or can be synthesized from data acquired using point sources. The calculated data $\psi_{calc}$ on the other hand can usually be computed directly by using a generalized source function when forward modeling. For many types of forward modeling, including finite difference modeling, the computation time needed for a generalized source is roughly equal to the computation time needed for a point source.

Equation 1 can be simplified to:

$$S(M) = \sum_{g=1}^{N_g} W(\delta(M, w_g)) \quad (2)$$

where the sum over receivers and time samples is now implied and, $$\delta(M,w_g)=\psi_{calc}(M,w_g)-\psi_{obs}(w_g) \quad (3)$$

The object of inversion by cost function optimization is to attempt to update the model M such that S(M) is a minimum. This can be accomplished local cost function optimization which updates the given model $M^{(k)}$ as follows:

$$M^{(k+1)}=M^{(k)}-\alpha^{(k)}\nabla_M S(M) \quad (4)$$

where k is the iteration number, α is the scalar size of the model update, and $\nabla_M S(M)$ is the gradient of the misfit function, taken with respect to the model parameters. The model perturbations, or the values by which the model is updated, are calculated by multiplication of the gradient of the objective function with a step length α, which must be repeatedly calculated.

From Equation 2, the following equation can be derived for the gradient of the cost function:

$$\nabla_M S(M) = \sum_{g=1}^{N_g} \nabla_M W(\delta(M, w_g)). \quad (5)$$

So to compute the gradient of the cost function, it is necessary to separately compute the gradient of each gather's contribution to the cost function, then sum those contributions. Therefore, the computational effort required for computing $\nabla_M S(M)$ is $N_g$ times the compute effort required to determine the contribution of a single gather to the gradient. For geophysical problems $N_g$ usually corresponds to the number of geophysical sources (each location of a source apparatus being considered a separate source) and is on the order of 10,000 to 100,000, greatly magnifying the cost of computing $\nabla_M S(M)$.

It may be noted that computation of $\nabla_M W(\delta)$ requires computation of the derivative of W(δ) with respect to each of the N model parameters $m_i$. Since for geophysical problems N is usually very large (the number of different parameters times the number of model grid cells where the parameters must be assigned values is usually more that one million), this computation can be extremely time consuming if it had to be performed for each individual model parameter.

What is needed is a more efficient method of computing the cost function gradient, without significant reduction in the accuracy of the local cost function optimization. The present invention satisfies this need.

SUMMARY OF THE INVENTION

In one embodiment, the invention is a computer implemented method for inversion of measured geophysical data to determine a physical properties model for a subsurface region, comprising:

(a) obtaining a group of two or more encoded gathers of the measured geophysical data, wherein each gather is associated with a single generalized source or, using source-receiver reciprocity, with a single receiver, and wherein each gather is encoded with a different encoding function selected from a set of non-equivalent encoding functions;

(b) summing the encoded gathers in the group by summing all data records in each gather that correspond to a single receiver (or source if reciprocity is used), and repeating for each different receiver, resulting in a simultaneous encoded gather;

(c) assuming a physical properties model of the subsurface region, said model providing values of at least one physical property at locations throughout the subsurface region; and (d) inverting the measured geophysical data, one simultaneous encoded gather at a time, using the assumed physical properties model as an initial model, and iteratively updating said model to minimize a cost function measuring degree of misfit between model-simulated data and the measured geophysical data to generate an updated physical properties model, wherein model adjustments are made using a gradient of the cost function with respect to at least one model parameter, which gradient is computed from a time integration of a product of encoded simultaneous-source data simulated forward in time and encoded simultaneous-source data simulated backward in time.

The updated physical properties model typically is downloaded from the computer or saved to computer storage, and ultimately used to infer presence or absence of accumulations of hydrocarbons in the subsurface region.

BRIEF DESCRIPTION OF THE DRAWINGS

The present invention and its advantages will be better understood by referring to the following detailed description and the attached drawings in which.

Figure 1:
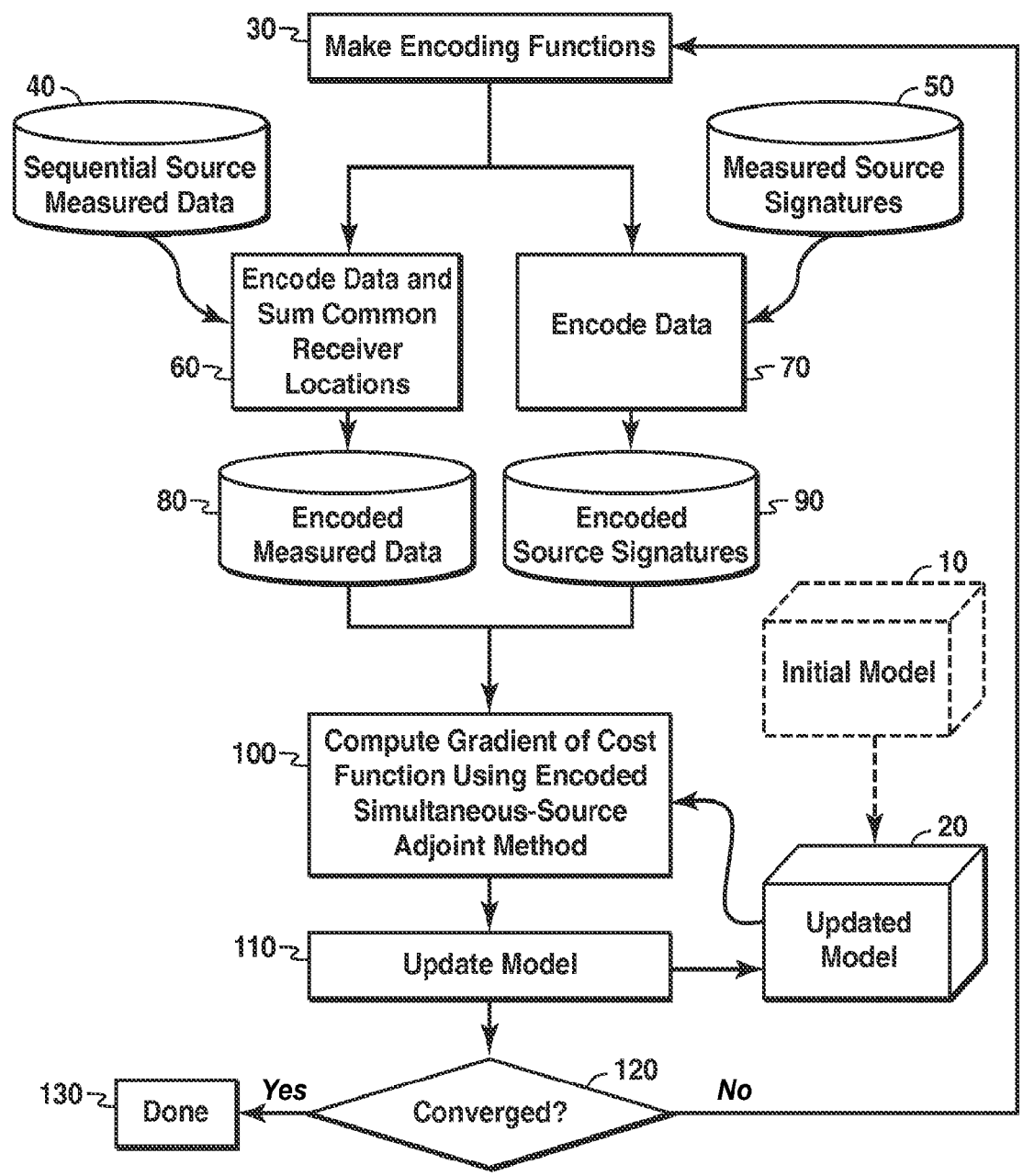
FIG. 1 is a flow chart showing basic steps in one embodiment of the present invention.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present invention embodies a realization that the computational time needed to perform local cost function optimization can be greatly reduced by using a method called the adjoint method to calculate the gradients of the cost function needed for the local optimization process, and then applying that approach to invert encoded gathers of simultaneous source data, thereby computing the gradient of an encoded simultaneous source cost function.

The adjoint method can be used to efficiently perform (see the discussion following Equation 5) the computation of the derivative of $W(\delta)$ with respect to each of the N model parameters $m_i$, for all model parameters at once [1]. The adjoint method for the least squares objective function and a gridded model parameterization may be summarized by the following algorithm:

Algorithm 2

Algorithm for computing the least-squares cost-function gradient of a gridded model using the adjoint method.

1. Compute forward simulation of the data using the current model and the gather signature $w_g$ as the source to get $\psi_{calc}(M^{(k)}, w_g)$,
2. Subtract the observed data from the simulated data giving $\delta(M^{(k)}, w_g)$,
3. Compute the reverse simulation (i.e. backwards in time) using $\delta(M^{(k)}, w_g)$ as the source producing $\psi_{adjoint}(M^{(k)}, w_g)$,
4. Compute the integral over time of the product of $\psi_{calc}(M^{(k)}, w_g)$ and $\psi_{adjoint}(M^{(k)}, w_g)$ to get $\nabla_M W(\delta(M, w_g))$.

While computation of the gradients using the adjoint method is efficient relative to other methods, it is still very costly. In particular the adjoint method requires two simulations, one forward in time and one backward in time, and for geophysical problems these simulations are usually very compute intensive. Also, as discussed above, this adjoint method computation must be performed for each measured data gather individually, increasing the compute cost by a factor of $N_g$.

As stated in reference [4], the compute cost of all categories of inversion can be reduced by inverting data from combinations of the sources, rather than inverting the sources individually. This may be called simultaneous source inversion. Several types of source combination are known including: coherently summing closely spaced sources to produce an effective source that produces a wavefront of some desired shape (e.g. a plane wave), summing widely spaces sources, or fully or partially stacking the data before inversion.

The compute cost reduction gained by inverting combined sources is at least partly offset by the fact that inversion of the combined data usually produces a less accurate inverted model. This loss in accuracy is due to the fact that information is lost when the individual sources are summed, and therefore the summed data does not constrain the inverted model as strongly as the unsummed data. This loss of information during summation can be minimized by encoding each shot record before summing. Encoding before combination preserves significantly more information in the simultaneous source data, and therefore better constrains the inversion [4]. Encoding also allows combination of closely spaced sources, thus allowing more sources to be combined for a given computational region. Various encoding schemes can be used with this technique including time shift encoding and random phase encoding. Next follow brief reviews of various published geophysical simultaneous source techniques, both encoded and non-encoded.

Van Manen [5] suggests using the seismic interferometry method to speed up forward simulation. Seismic interferometry works by placing sources everywhere on the boundary of the region of interest. These sources are modeled individually and the wavefield is recorded at all locations for which a Green's function is desired. The Green's function between any two recorded locations can then be computed by cross-correlating the traces acquired at the two recorded locations and summing over all the boundary sources. If the data to be inverted have a large number of sources and receivers that are within the region of interest (as opposed to having one or the other on the boundary), then this is a very efficient method for computing the desired Green's functions. However, for the seismic data case it is rare that both the source and receiver for the data to be inverted are within the region of interest. Therefore, this improvement has very limited applicability to the seismic inversion problem.

Berkhout [6] and Zhang [7] suggest that inversion in general can be improved by inverting non-encoded simultaneous sources that are summed coherently to produce some desired wave front within some region of the subsurface. For example point source data could be summed with time shifts that are a linear function of the source location to produce a downgoing plane wave at some particular angle with respect to the surface. This technique could be applied to all categories of inversion. A problem with this method is that coherent summation of the source gathers necessarily reduces the amount of information in the data. So for example, summation to produce a plane wave removes all the information in the seismic data related to travel time versus source-receiver offset. This information is critical for updating the slowly varying background velocity model, and therefore Berkhout's method is not well constrained. To overcome this problem many different coherent sums of the data (e.g. many plane waves with different propagation directions) could be inverted, but then efficiency is lost since the cost of inversion is proportional to the number of different sums inverted. We call such coherently summed sources generalized sources. Therefore, a generalized source can either be a point source or a sum of point sources that produces a wave front of some desired shape.

Van Riel [8] suggests inversion by non-encoded stacking or partial stacking (with respect to source-receiver offset) of the input seismic data, then defining a cost function with respect to this stacked data which will be optimized. Thus, this publication suggests improving cost function based inversion using non-encoded simultaneous sources. As was true of the Berkhout's [6] simultaneous source inversion method, the stacking suggested by this method reduces the amount of information in the data to be inverted and therefore the inversion is less well constrained than it would have been with the original data.

Mora [9] proposes inverting data that are the sum of widely spaced sources. Thus, this publication suggests improving the efficiency of inversion using non-encoded simultaneous source simulation. Summing widely spaced sources has the advantage of preserving much more information than the coherent sum proposed by Berkhout. However, summation of widely spaced sources implies that the aperture (model region inverted) that must be used in the inversion must be increased to accommodate all the widely spaced sources. Since the compute time is proportional to the area of this aperture, Mora's method does not produce as much efficiency gain as could be achieved if the summed sources were near each other.

Ober [10] suggests speeding up seismic migration, a special case of non-iterative inversion, by using simultaneous encoded sources. After testing various coding methods, Ober found that the resulting migrated images had significantly reduced signal-to-noise ratio due to the fact that broad band encoding functions are necessarily only approximately orthogonal. Thus, when summing more than 16 shots, the quality of the inversion was not satisfactory. Since non-iterative inversion is not very costly to begin with, and since high signal-to-noise ratio inversion is desired, this technique is not widely practiced in the geophysical industry.

Ikelle [11] suggests a method for fast forward simulation by simultaneously simulating point sources that are activated (in the simulation) at varying time intervals. A method is also discussed for decoding these time-shifted simultaneous-source simulated data back into the separate simulations that would have been obtained from the individual point sources. These decoded data could then be used as part of any conventional inversion procedure. A problem with Ikelle's method is that the proposed decoding method will produce separated data having noise levels proportional to the difference between data from adjacent sources. This noise will become significant for subsurface models that are not laterally constant, for example from models containing dipping reflectors. Furthermore, this noise will grow in proportion to the number of simultaneous sources. Due to these difficulties Ikelle's simultaneous source approach may result in unacceptable levels of noise if used in inverting a subsurface that is not laterally constant.

Krebs et al. [4] show that the encoded simultaneous source cost function can be computed more efficiently than conventional cost functions while still providing accurate inversions. The simultaneous source cost function is defined here as (compare with Equation 2 above):

$$S_{sim}(M) = \sum_{G=1}^{N_G} W\left(\delta\left(M, \sum_{g \in G} c_g \otimes w_g\right)\right) \quad (6)$$

where a summation over receivers and time samples is implied as in Equation 2, and:

$\sum_{g=1}^{N_g} = \sum_{G=1}^{N_G} \sum_{g \in G}$ defines a sum over gathers by sub groups of gathers, $S_{sim}$=cost function for simultaneous source data,
G=the groups of simultaneous generalized sources, and $N_G$=the number of groups, $c_g$=functions of time that are convolved ($\otimes$) with each gather's source signature to encode the gathers, these encoding functions are chosen to be different, i.e. non-equivalent (e.g., without limitation, approximately orthogonal), for each gather index g (e.g. different realizations of random phase functions).

The outer summation in Equation 6 is over groups of simultaneous generalized sources corresponding to the gather type (e.g. point sources for common shot gathers). The inner summation, over g, is over the gathers that are grouped for simultaneous computation. For some forward modeling methods, such as finite difference modeling, the computation of the forward model for summed generalized sources (the inner sum over g∈G) can be performed in the same amount of time as the computation for a single source. Therefore, as shown in Krebs et al. [4], $\delta(M,\Sigma c_g(\otimes) w_g)$ can be computed very efficiently using an approach such as Algorithm 3:

Algorithm 3

Algorithm for computing the encoded simultaneous-source cost function.

1. Simulate $\psi_{calc}(M,\Sigma c_g \otimes w_g)$ using a single run of the simulator using $\Sigma c_g \otimes w_g$ as the source,
2. Convolve each measured data gather with the $c_g$ encoding functions then sum the resulting encoded gathers (i.e. $\Sigma c_g \otimes \psi_{obs}(w_g)$),
3. Subtract the result of step 2 from the result of step 1.

Again as shown in Krebs et al. [4], this algorithm can compute $S_{sim}(M)$ a factor of $N_g/N_G$ times faster than $S(M)$ from Equation 2.

The above algorithm, or variants of it that will occur to persons skilled in the technical field, can be used to very efficiently calculate $S_{sim}(M)$ and therefore can greatly speed up inversions that only require computation of the cost function, such as global inversion methods. In fact, the above algorithm can also speed up computation of the cost function gradient for many gradient evaluation methods. For example, finite difference computation of the gradient involves computation of the cost function for a model M and a nearby model M+δM that has one of its parameters perturbed by a small amount.

However, the extremely large number of model parameters typical of geophysical inversion implies that computing the gradient of $S_{sim}(M)$ will still be very costly if conventional gradient computation methods, such as finite differences, are employed. This problem is solved in the present invention by computing the gradient of $S_{sim}(M)$ using an adjoint method. Thus, a goal of this invention is to compute $\nabla_M S_{sim}(M)$ which is defined as follows:

$$\nabla_M S_{sim}(M) = \sum_{G=1}^{N_G} \nabla_M W\left(\delta\left(M, \sum_{g \in G} c_g \otimes w_g\right)\right) \quad (7)$$

In this invention, the quantities $\nabla_M W(\delta(M,\Sigma c_g (\otimes) w_g))$ can be computed very efficiently using an adjoint-style method such as is outlined in Algorithm 4:

Algorithm 4

Algorithm for computing the encoded simultaneous-source cost-function gradient using an adjoint style method.

1. Compute forward simulation of the simultaneous source data, in a single run of the simulator, using the current model and the simultaneous source gather signature $\Sigma c_g \otimes w_g$ as the source to get $\psi_{calc}(M^{(k)}, \Sigma c_g \otimes w_g)$,
2. Convolve each measured data gather with the $c_g$ encoding functions then sum the resulting encoded gathers (i.e. $\Sigma c_g \otimes \psi_{obs}(w_g)$),
3. Subtract the result of step 2 from the result of step 1 yielding $\delta(M^{(k)}, \Sigma c_g \otimes w_g)$,
4. Compute the reverse simulation (i.e. backwards in time) using $\delta(M^{(k)}, \Sigma c_g \otimes w_g)$ as the source producing $\psi_{adjoint}(M^{(k)}, \Sigma c_g \otimes w_g)$,
5. Compute the integral over time of the product of $\psi_{calc}(M^{(k)}, \Sigma c_g \otimes w_g)$ and $\psi_{adjoint}(M^{(k)}, \Sigma c_g \otimes w_g)$, to get $\nabla_M W(\delta(M, \Sigma c_g \otimes w_g))$.

In practice, the invention may typically be used to perform local cost function inversion according to the flow chart of one embodiment of the invention shown in FIG. 1. As in conventional iterative inversion, the process begins with selection of an initial model 10 that is an approximation of the actual subsurface physical properties. (An updated model 20 replaces the initial model in later iterations of the inversion.) In the next step of the inversion (30), encoding functions are built; these will be used to encode the measured data 40 in step 60 and the source signatures 50 in step 70. As discussed below and in reference [4], many different types of encoding function can be made in step 30. Steps 60 and 70 produce the encoded measured data (summed over source locations for each receiver) 80 and the encoded source signatures 90, both of which are encoded with the same set of encoding functions produced in step 30, a process explained further in reference [4] for readers not skilled in the field. In step 100, the gradient is computed using Equation 7 and Algorithm 4 above, or obvious variations thereof. In step 110, the initial model is updated based on the gradient computed in step 100, usually by adding or subtracting a scaled version of the gradient to the initial model. Step 120 is a check for convergence of the inversion. This can be performed by computing the encoded simultaneous-source cost function for the updated model using Equation 6 and Algorithm 3, and comparing the cost function's value to the value from the previous iteration. If the inversion is judged not to have converged, then the process iterates back to step 30, using updated model 20 from step 110. When test 120 shows that the iteration has converged, or another stopping condition is met, the process is finished (130).

Many types of encoding functions $c_g$ can be used in Equation 6 and Equation 7, including but not limited to:

Linear, random, chirp and modified chirp frequency dependent phase encoding as presented in Romero et al. [12];
The frequency independent phase encoding as presented in Jing et al. [13];
Random time shift encoding;
Frequency division multiplexing (FDMA), time division multiplexing (TDMA) and code division multiplexing (CDMA) used in telecommunications.

Some of these encoding techniques will work better than others depending upon the application, and some can be combined. In particular, good results have been obtained using frequency dependent random phase encoding and also by combining frequency independent encoding of nearby sources with frequency dependent random phase encoding for more widely separated sources. An indication of the relative merits of different encodings can be obtained by running test inversions with each set of encoding functions to determine which converges faster.

It should be noted that the simultaneous encoded-source technique can be used for many types of inversion cost function. In particular it could be used for cost functions based on other norms than L2 discussed above. It could also be used on more sophisticated cost functions than the one presented in Equation 2, including regularized cost functions. Finally, the simultaneous encoded-source method could be used with any type of global or local cost function inversion method including Monte Carlo, simulated annealing, genetic algorithm, evolution algorithm, gradient line search, conjugate gradients and Newton's method.

The present inventive method can also be used in conjunction with various types of generalized source techniques, such as those suggested by Berkhout [6]. In this case, rather than encoding different point source gather signatures, one would encode the signatures for different synthesized plane waves.

Some variations on the embodiment described above include:

The $c_g$ encoding functions can be changed for each iteration of the inversion. In at least some instances this leads to faster convergence of the inversion.
In some cases (e.g., when the source sampling is denser than the receiver sampling) it may be advantageous to use reciprocity to treat the actual receivers as computational sources, and encode the receivers instead of the sources.
This invention is not limited to single-component point receivers. For example, the receivers could be receiver arrays or they could be multi-component receivers.
The present inventive method may be improved by optimizing the encoding to yield the highest quality inversion. For example the encoding functions could be optimized to reduce the number of local minima in the cost function. The encoding functions could be optimized either by manual inspection of tests performed using different encoding functions or using an automated optimization procedure.
Acquisition of simultaneous encoded-source data could result in significant geophysical data acquisition cost savings.
For marine seismic data surveys, it would be very efficient to acquire encoded source data from simultaneously operating marine vibrators that operate continuously while in motion.
Other definitions for the cost function may be used, including the use of a different norm (e.g. L1 norm (absolute value) instead of L2 norm), and additional terms to regularize and stabilize the inversion (e.g. terms that would penalize models that aren't smooth or models that are not sparse).

Figure 2:
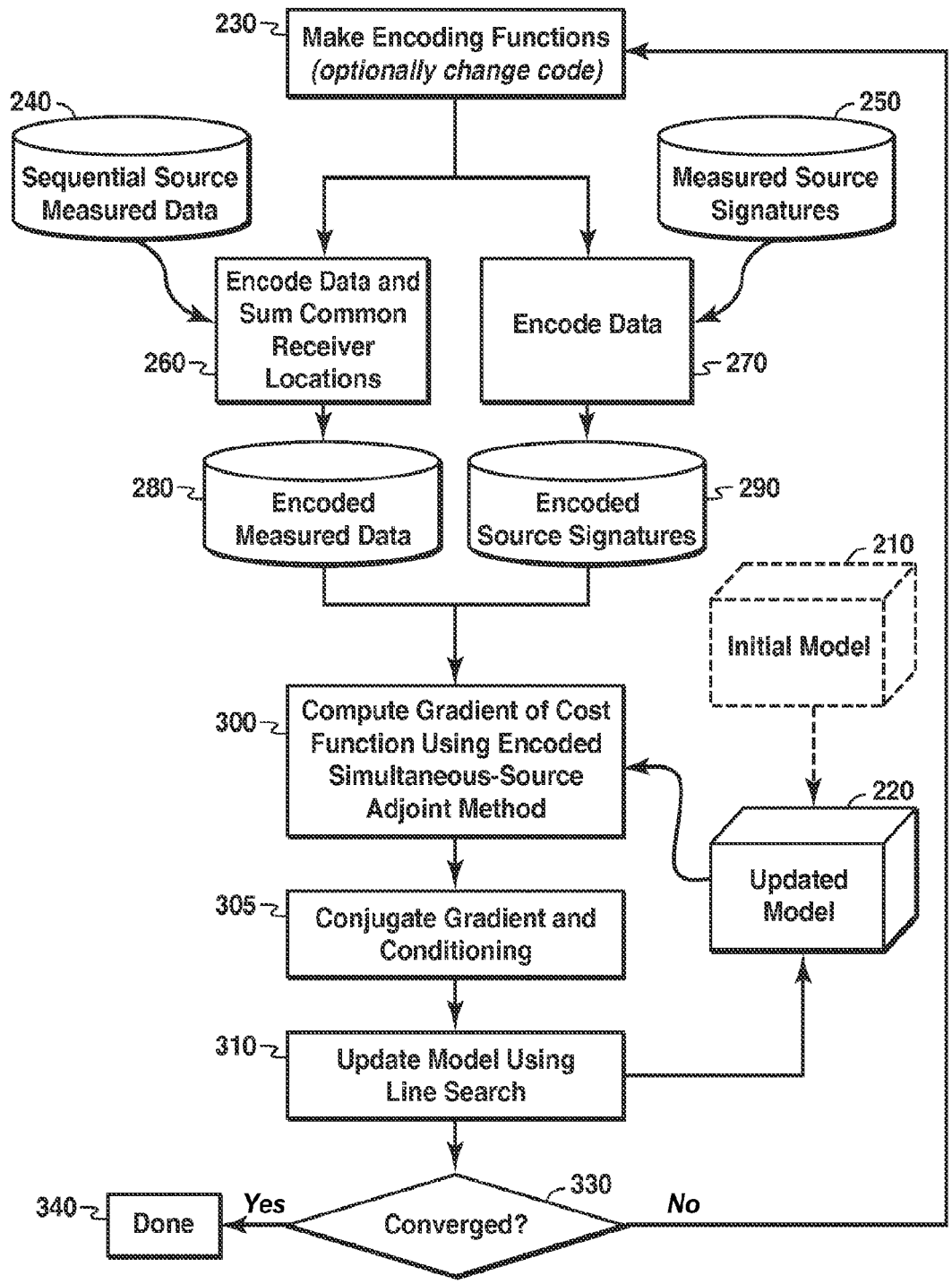
FIG. 2 is a flow chart showing basic steps in an alternative embodiment of the present invention.

FIG. 2 is a flow chart of an alternative embodiment of the present inventive method for local cost function inversion. This flow chart is substantially similar to that in FIG. 1 (reference numbers of corresponding boxes are incremented by 200) except for the following changes:

In step 230 the encoding functions may be changed between iterations.
Step 305 is added. In step 305, the gradient from step 300 is conditioned using any well known method, and for better convergence the conditioned gradient is used to compute the conjugate gradient. In (local) optimization schemes, it is well know that the convergence of an algorithm can be improved by choosing a decent direction (the gradient) as a linear combination of the past and current decent directions. This is known as the conjugate gradient method. Conditioning (or pre-conditioning) is a classically known strategy for improving convergence.

In step 310, a line search in the direction of the conjugate gradient is used to update the model. A line search is part of standard optimization strategies and consists of starting at a current point, choosing a direction for evaluating the cost function values, moving along that chosen direction and re-evaluating the cost function at each new location, and choosing the point that gave the minimum value of that cost function. The direction (in this case) is the gradient or conjugate gradient.

Additionally the following choices are made during the inversion in this particular illustrative embodiment of the present inventive method:

1. The input seismic gathers of measured data 240 are common point source gathers.
2. The encoding signatures 230 are chosen to be random phase signatures from Romero et al. Such a signature can be made simply by making a sequence that consists of time samples which are a uniform pseudo-random sequence.
3. In steps 260 and 270, the gathers and signatures are encoded by convolving each trace in the gather with that gather's encoding signature.
4. In steps 300 and 320, the simulations are performed with a finite difference seismic modeling code in the space-time domain.
5. In steps 300 and 320, the cost function is computed using an L2 norm.

EXAMPLE

FIGS. 3 to 9 present a synthetic example of inverting constant-density acoustic seismic data using this invention and for comparison with the conventional sequential source method. For this example the embodiment described in FIG. 2 was used excepting that step 305 was eliminated. Inclusion of step 305 improves the results relative to this example, so this is a conservative example of the advantages of this invention.

Figure 3:
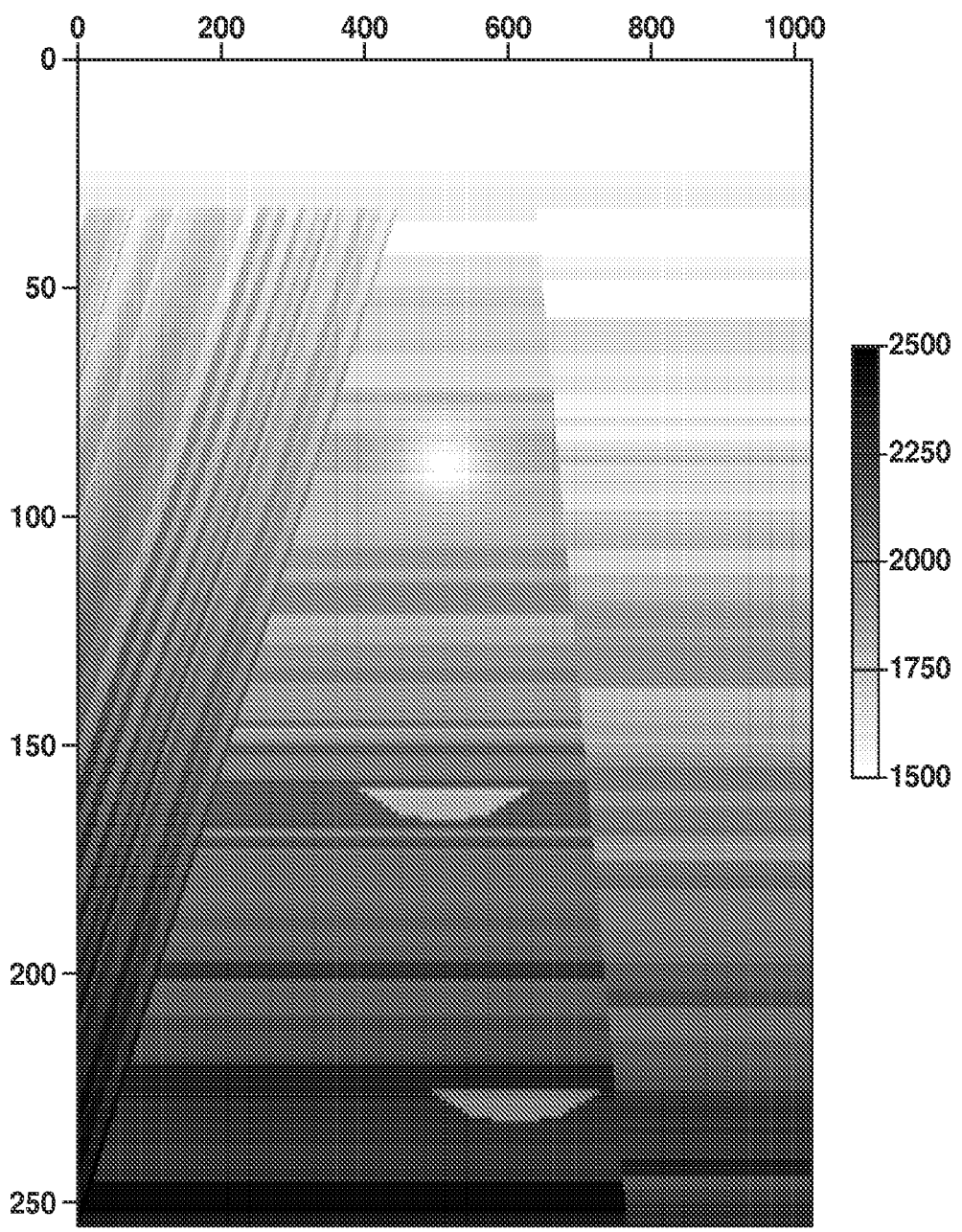
FIG. 3 shows the base velocity model used to generate the measured data used in the example presented herein, with the gray-scale bar showing velocity in m/s.

FIG. 3 is the base velocity model used to generate the measured data (FIG. 4) for this example. A successful inversion of the measured data simulated from this model should look like a band-limited version of FIG. 3.

Figure 4:
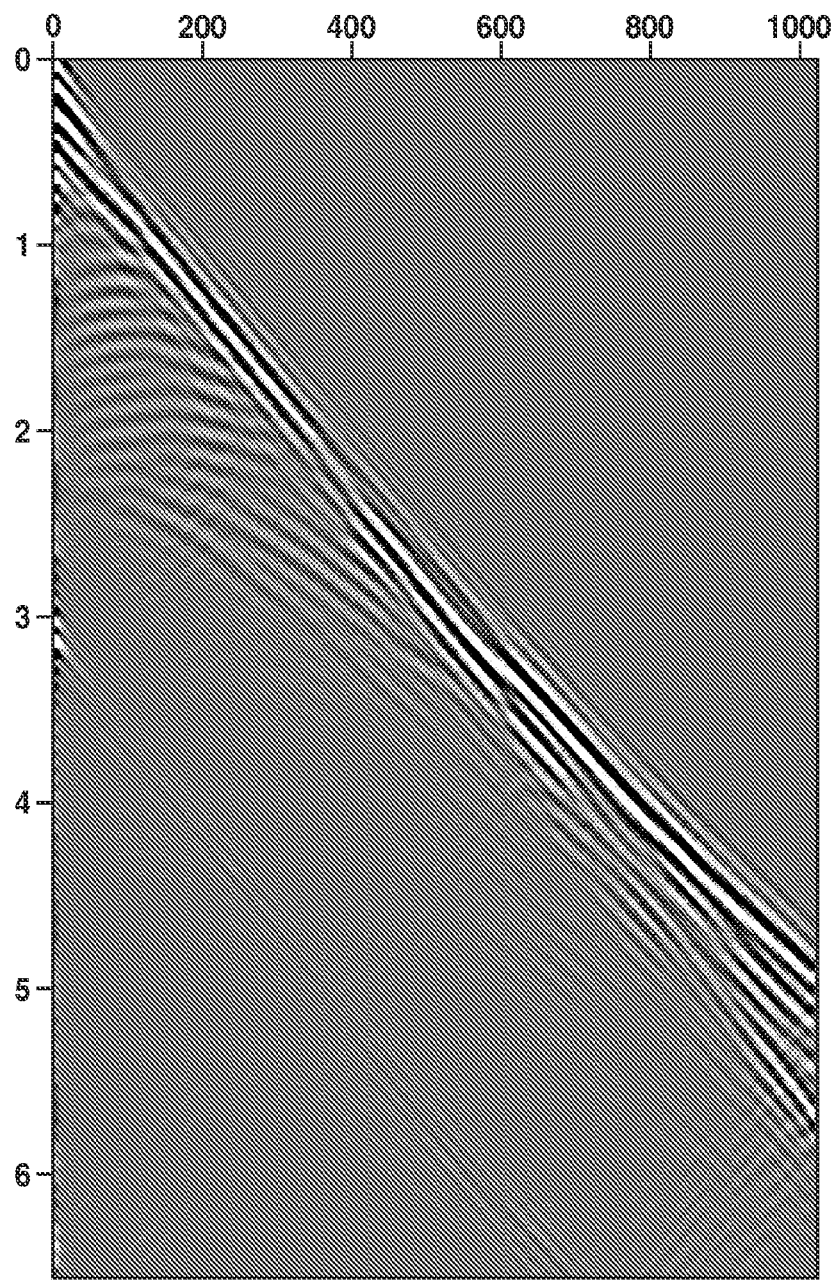
FIG. 4 shows one source gather of sequential source data from the model shown in FIG. 3.

FIG. 4 shows one source gather of measured data simulated from the model in FIG. 3. A total of 128 sources were simulated (of which FIG. 4 is the first) with the sources positioned near the surface of the model and spread out evenly across the model. 1024 seismic receivers were also spread out evenly across the model. The same set of receivers was used for each source location (i.e. the receivers do not move with the source).

Figure 5:
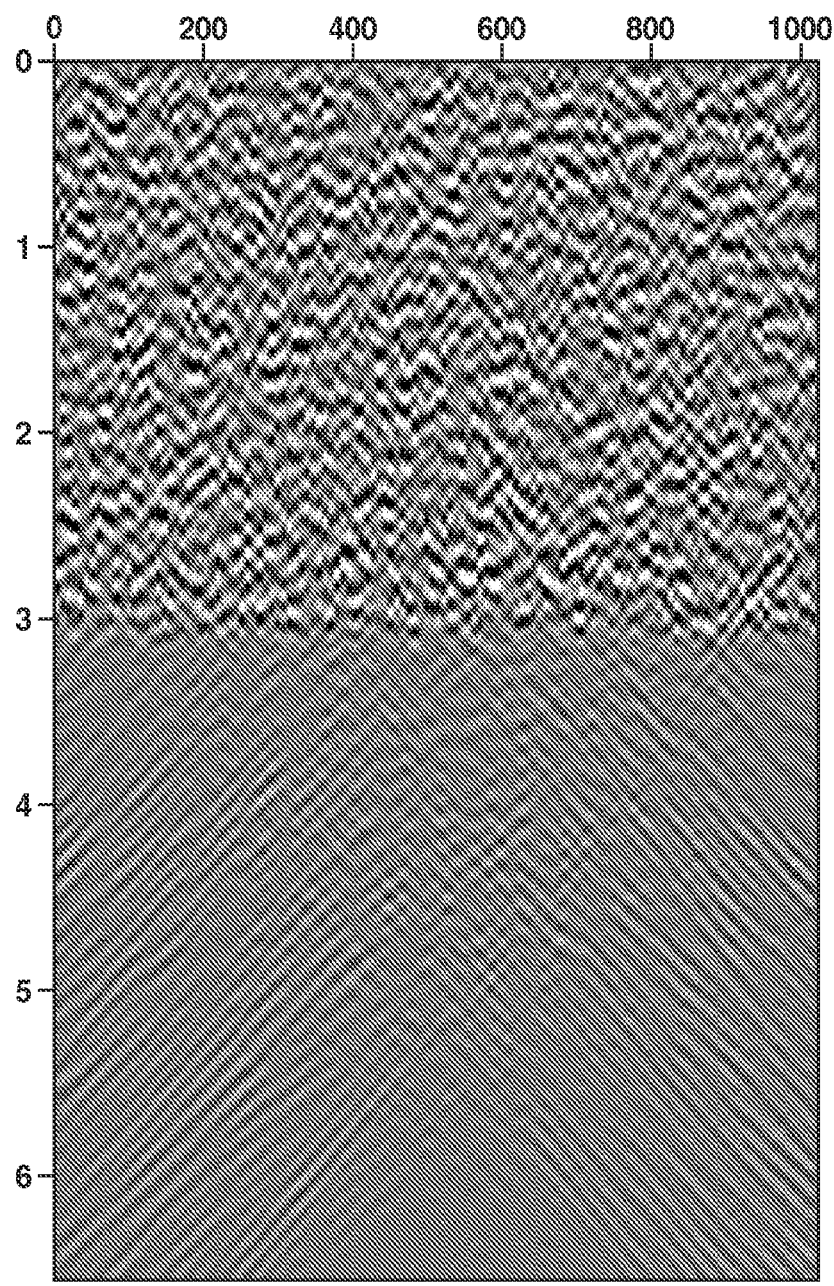
FIG. 5 shows simultaneous encoded source data generated from step 260 of FIG. 2.

FIG. 5 shows the simultaneous encoded source data generated from step 260 of FIG. 2. The encoding function was a 3 second long random phase function. All 128 sources were encoded with different random phase functions then summed to produce this simultaneous encoded source. Note that the encoded simultaneous source data in FIG. 5 look like random noise when compared with FIG. 4.

Figure 6:
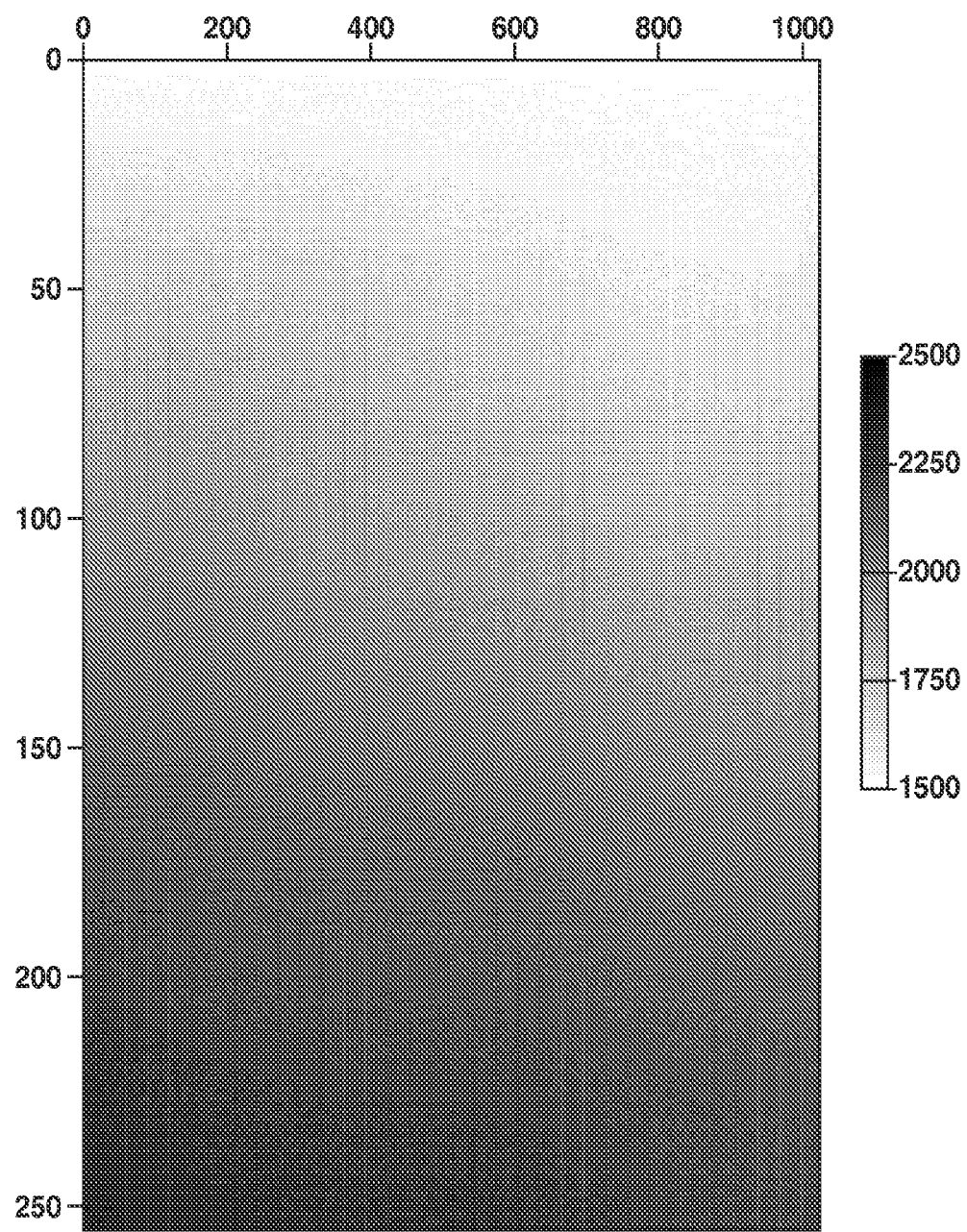
FIG. 6 shows the initial model (210 in FIG. 2) for the inversion example.

FIG. 6 shows the model that was used as the initial model (210 in FIG. 2) for this inversion example. This model was generated by heavily smoothing the base model shown in FIG. 3. The smoothing was chosen to be great enough to remove all reflections and small scale velocity anomalies, while preserving the smooth background of the model.

The data in FIG. 4 and FIG. 5 were then both inverted. Of course, the present invention was used to invert the simultaneous encoded source data in FIG. 5. It may be noted that since the there are 128 source gathers in the sequential source data, inversion of these data must take roughly 128 times more compute effort per iteration than needed to invert the encoded simultaneous source data. This factor of 128 is due to the fact that the gradient must be computed for each sequential source separately, and then these gradients are summed to produce the total sequential source gradient. On the other hand, the gradient for the encoded simultaneous source data is computed from just one gather.

Figure 7:
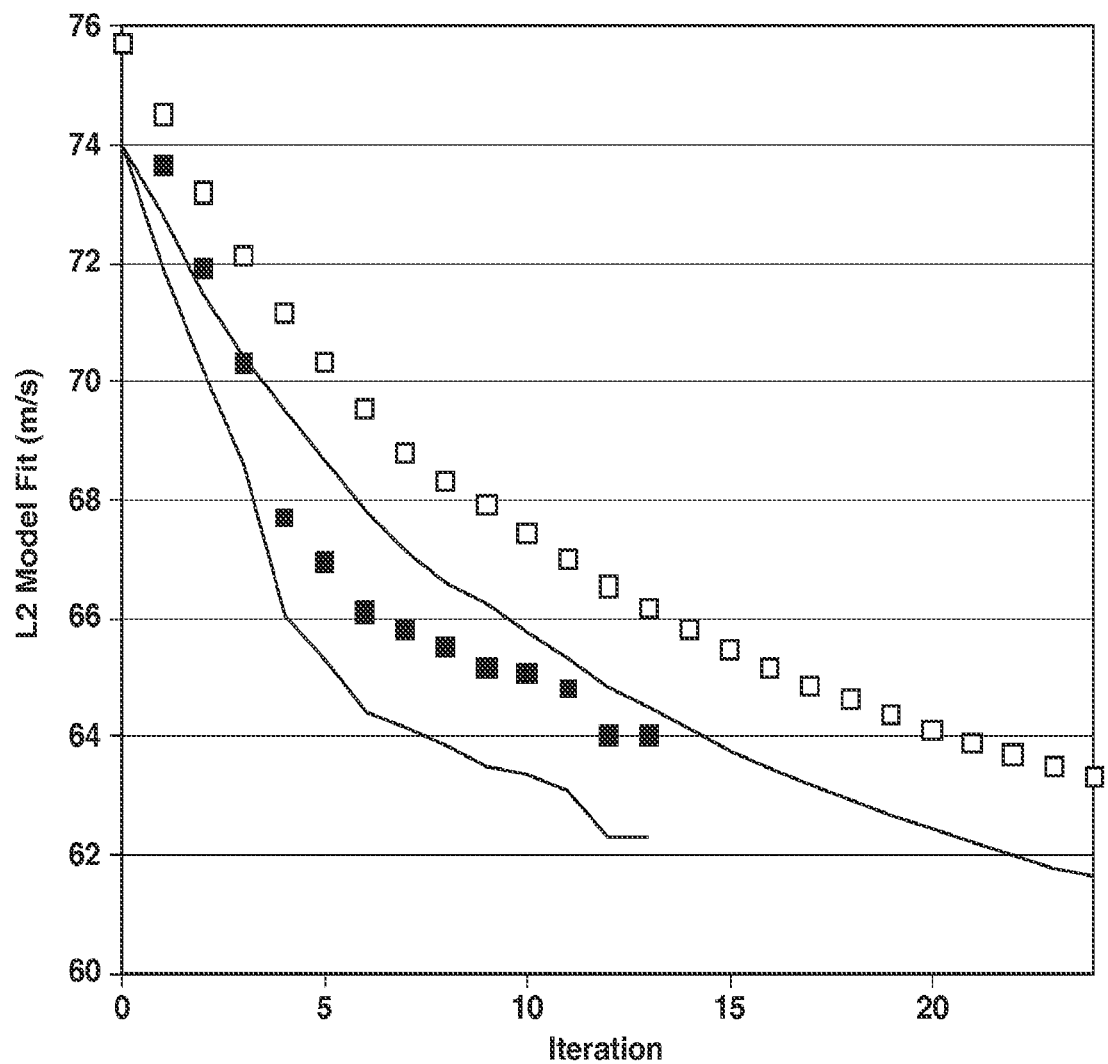
FIG. 7 shows an L2 norm model fit versus iteration of the sequential source and encoded simultaneous source inversions in the example.

FIG. 7 shows the model fit versus iteration number for the two inversions. The sequential source inversion (black squares) converges at roughly twice the rate of the encoded simultaneous-source inversion (white squares). (The model fit for iteration 21 of encoded simultaneous source inversion is roughly equal to the model fit for iteration 12 of sequential source inversion.) However, since each iteration of simultaneous source inversion uses only $\frac{1}{128}$ the amount of compute effort, the encoded simultaneous source inversion is 64 times more efficient than sequential source inversion.

Figure 8:
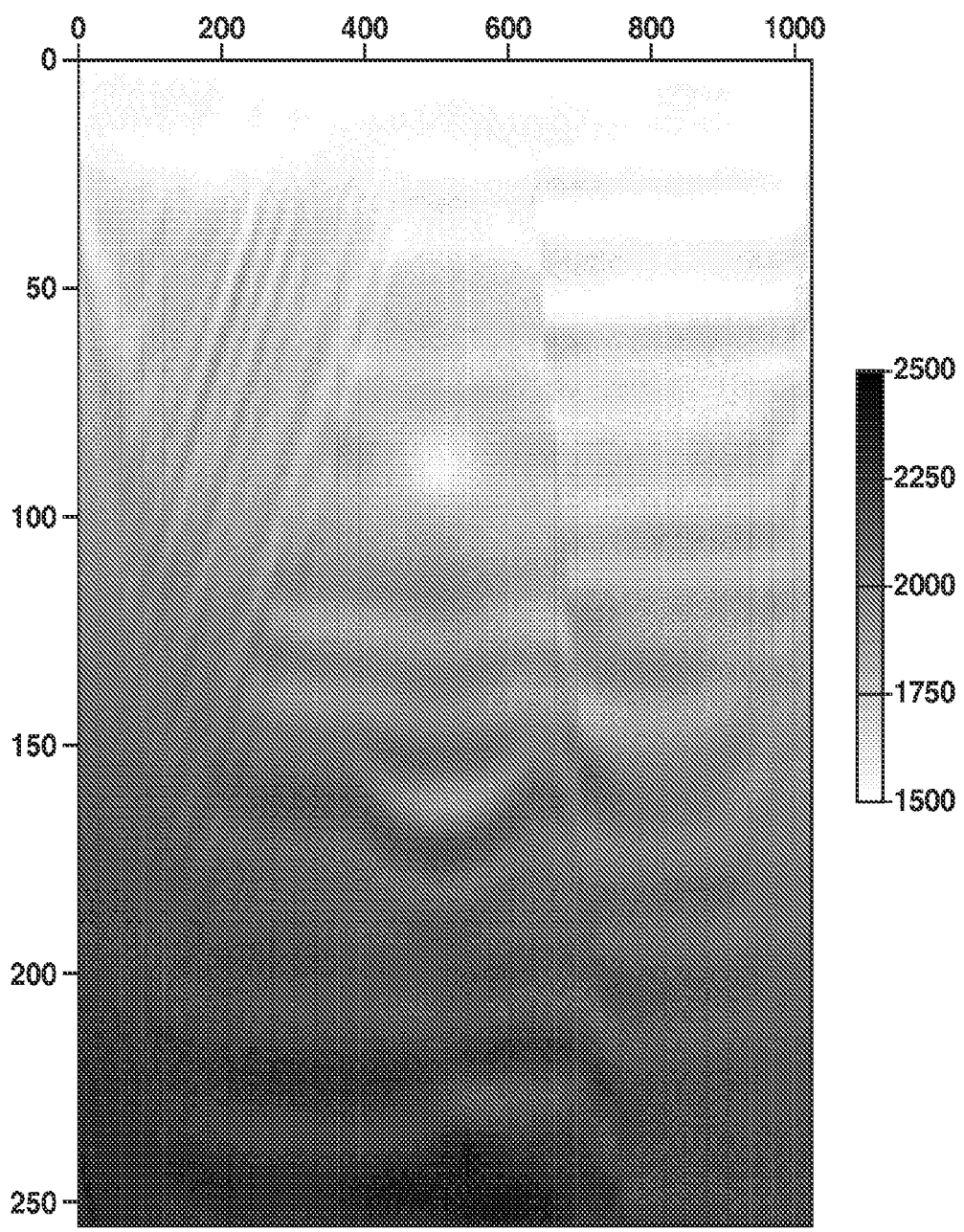
FIG. 8 shows the results of the twelfth iteration of the example's sequential source inversion.
Figure 9:
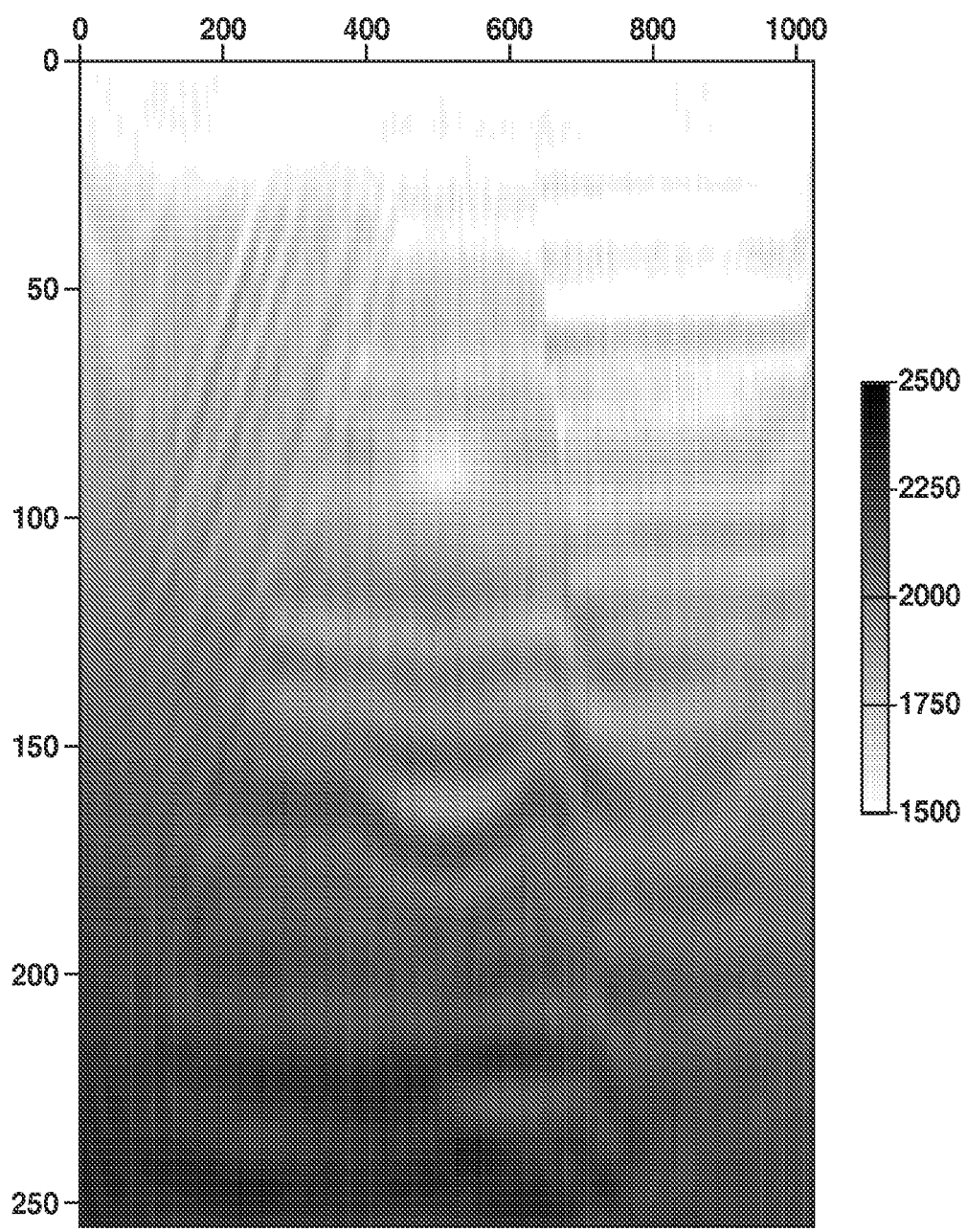
FIG. 9 shows the results of the twenty-first iteration of the encoded simultaneous source inversion in the example.

FIG. 8 and FIG. 9 show both of the inversion results. The $12^{th}$ sequential source inversion and the $21^{st}$ encoded simultaneous-source inversions were chosen for display, because the have approximately the same model fit. Note that both of these inversions look roughly like a band limited version of the base model in FIG. 3. Notice also that the encoded simultaneous-source inversion looks very much like the sequential source inversion, except for the addition of a small amount of noise. This noise could be easily removed by either image processing the inversion result or by applying conditioning (step 305 of FIG. 2) to the inversion.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented. In such cases, the resulting updated physical properties model may either be downloaded or saved to computer storage.

References

1. Tarantola, A., "Inversion of seismic reflection data in the acoustic approximation," *Geophysics* 49, 1259-1266 (1984).
2. Sirgue, L., and Pratt G. "Efficient waveform inversion and imaging: A strategy for selecting temporal frequencies," *Geophysics* 69, 231-248 (2004).
3. Fallat, M. R., Dosso, S. E., "Geoacoustic inversion via local, global, and hybrid algorithms," *Journal of the Acoustical Society of America* 105, 3219-3230 (1999).
4. Krebs, J. R., Anderson, J. A., Neelamani, R., Hinkley, D., Jing, C., Dickens, T., Krohn, C., Traynin, P., "Iterative inversion of data from simultaneous geophysical sources," PCT Publication No. WO2008/042081.
5. Van Manen, D. J., Robertsson, J. O. A., Curtis, A., "Making wave by time reversal," *SEG International Exposition and $75^{th}$ Annual Meeting Expanded Abstracts*, 1763-1766 (2005).
6. Berkhout, A. J., "A real shot record technology," *Journal of Seismic Exploration* 1, 251-264 (1992).

7. Zhang, Y., Sun, J., Notfors, C., Gray, S. H., Cherris, L., Young, J., "Delayed-shot 3D depth migration," *Geophysics* 70, E21-E28 (2005).
8. Van Riel, P., and Hendrik, W. J. D., "Method of estimating elastic and compositional parameters from seismic and echo-acoustic data," U.S. Pat. No. 6,876,928 (2005).
9. Mora, P., "Nonlinear two-dimensional elastic inversion of multi-offset seismic data," *Geophysics* 52, 1211-1228 (1987).
10. Ober, C. C., Romero, L. A., Ghiglia, D.C., "Method of Migrating Seismic Records," U.S. Pat. No. 6,021,094 (2000).
11. Ikelle, L. T., "Multi-shooting approach to seismic modeling and acquisition," U.S. Pat. No. 6,327,537 (2001).
12. Romero, L. A., Ghiglia, D. C., Ober, C. C., Morton, S. A., "Phase encoding of shot records in prestack migration," *Geophysics* 65, 426-436 (2000).
13. Jing X., Finn, C. J., Dickens, T. A., Willen, D. E., "Encoding multiple shot gathers in prestack migration," *SEG International Exposition and 70$^{th}$ Annual Meeting Expanded Abstracts*, 786-789 (2000).

The invention claimed is:

1. A computer-implemented method for inversion of measured geophysical data to determine a physical properties model for a subsurface region, comprising:
   (a) obtaining a group of two or more encoded gathers of the measured geophysical data, wherein each gather is associated with a single generalized source or, using source-receiver reciprocity, with a single receiver, and wherein each gather is encoded with a different encoding function selected from a set of non-equivalent encoding functions;
   (b) summing the encoded gathers in the group by summing all data records in each gather that correspond to a single receiver, or source if reciprocity is used, and repeating for each different receiver, resulting in a simultaneous encoded gather;
   (c) assuming a physical properties model of the subsurface region, said model providing values of at least one physical property at locations throughout the subsurface region;
   (d) inverting, using a computer, the measured geophysical data, one simultaneous encoded gather at a time, using the assumed physical properties model as an initial model, and iteratively updating said model to minimize a cost function measuring degree of misfit between model-simulated data and the measured geophysical data to generate an updated physical properties model, wherein the model-simulated data are generated in a simulation that comprises solving a wave propagation equation, and wherein model adjustments are made in the updating using a gradient of the cost function with respect to at least one model parameter, which gradient is computed from a time integration of a product of encoded simultaneous-source data simulated forward in time and encoded simultaneous-source data simulated backward in time; and
   (e) downloading the updated physical properties model or saving it to computer storage.

2. The method of claim 1, wherein inverting a simultaneous encoded gather of measured geophysical data comprises
   (i) computer simulating a simultaneous encoded gather corresponding to the simultaneous encoded gather of measured data, using the assumed physical properties model, wherein the simulation uses source signatures encoded with the same encoding functions used to encode the simultaneous encoded gather of measured data, wherein an entire simultaneous encoded gather is simulated in a single simulation operation; and
   (ii) computing a cost function measuring degree of misfit between the simultaneous encoded gather of measured data and the simulated simultaneous encoded gather.

3. The method of claim 2, wherein the measured geophysical data include measured or estimated signatures of each source activation and the encoded source signatures used in the simulation operations are signatures made by temporally convolving the measured or estimated source signatures with the same encoding functions used to encode the corresponding measured gather in step (a).

4. The method of claim 1, further comprising using a different set non-equivalent encoding functions for at least one iteration of the iterative updating of the model.

5. The method of claim 1, wherein inverting the measured geophysical data comprises:
   (i) computing a forward simulation of the encoded simultaneous-source data in a single simulation run, using a current physical property model M and using as a source a simultaneous source gather signature encoded with the same encoding functions $c_g$ used to encode the measured data, to get $\Psi_{cal}$;
   (ii) computing the cost function $\delta$ by subtracting the simultaneous encoded gather of measured geophysical data from the result of step (i);
   (iii) calculating $\Psi_{adjoint}$ by computing a reverse simulation backwards in time, using $\delta$ as a simulation source; and
   (iv) computing an integral over time of the product of $\Psi_{cal}$ and $\Psi_{adjoint}$ to get the gradient of the cost function; and
   (v) using the gradient of the cost function to adjust and update model M.

6. The method of claim 1, wherein said encoded gathers of measured data are encoded by temporally convolving all traces from the gather with a corresponding encoded source signature, said encoded source signature being the convolution of a source function for the gather with the encoding function selected for the gather.

7. The method of claim 1, wherein the two or more encoded gathers of measured data are obtained by obtaining gathers of data from a geophysical survey in which data are acquired from a plurality of simultaneously operating, uniquely encoded source devices.

8. The method of claim 1, wherein the measured geophysical data are from a seismic survey.

9. The method of claim 8, wherein the generalized seismic sources are either all point sources or all plane-wave sources.

10. The method of claim 8, wherein the physical properties models are models of seismic wave velocity, seismic elastic parameters, seismic anisotropy parameters or seismic anelasticity parameters.

11. The method of claim 1, wherein the encoding functions are of a type selected from a group consisting of linear, random phase, chirp, modified chirp, random time shift, and frequency independent phase encoding.

12. The method of claim 1, wherein the encoding functions are of one type for some sources and of another type for other sources, each type being selected from a group consisting of linear, random phase, chirp, modified chirp, random time shift, and frequency independent phase encoding.

13. The method of claim 1, wherein the encoding functions are optimized with respect to the cost function being used.

14. The method of claim 1, wherein the simulation forward in time or the simulation backward in time in step (d) are performed with a finite difference, finite element or finite volume simulation code.

15. The method of claim 1, wherein a local cost function optimization method such as gradient line search, conjugate gradients or Newton's method is used to update the model.

16. The method of claim 1, wherein the cost function is the L1-norm cost function or the L2-norm cost function and the cost function may contain regularization terms, meaning terms that penalize models that are not smooth or models that are not sparse.

17. The method of claim 1, wherein the non-equivalent encoding functions are orthogonal functions.

18. A method for producing hydrocarbons from a subsurface region, comprising:
   (a) performing a geophysical survey of the subsurface region;
   (b) obtaining a physical properties model, said model having been constructed using a method as recited in claim 1, which is incorporated herein by reference;
   (c) using the physical properties model to identify a hydrocarbon bearing zone in the subsurface region;
   (d) drilling a well into the zone and producing hydrocarbons from the well.

19. The method of claim 1, wherein the physical properties model is a model of subsurface velocity or another quantity related to velocity.

20. A method for inversion of measured geophysical data from a subsurface region to prospect for hydrocarbons, comprising:
   (a) obtaining a group of two or more encoded gathers of the measured geophysical data, wherein each gather is associated with a single generalized source or, using source-receiver reciprocity, with a single receiver, and wherein each gather is encoded with a different encoding function selected from a set of non-equivalent encoding functions;
   (b) summing the encoded gathers in the group by summing all data records in each gather that correspond to a single receiver, or source if reciprocity is used, and repeating for each different receiver, resulting in a simultaneous encoded gather;
   (c) assuming a physical properties model of the subsurface region, said model providing values of at least one physical property at locations throughout the subsurface region;
   (d) inverting, using a computer, the measured geophysical data, one simultaneous encoded gather at a time, using the assumed physical properties model as an initial model, and iteratively updating said model to minimize a cost function measuring degree of misfit between model-simulated data and the measured geophysical data to generate an updated physical properties model, wherein the model-simulated data are generated in a simulation that comprises solving a wave propagation equation, and wherein model adjustments are made in the updating using a gradient of the cost function with respect to at least one model parameter, which gradient is computed from a time integration of a product of encoded simultaneous-source data simulated forward in time and encoded simultaneous-source data simulated backward in time; and
   (e) using the updated physical properties model to prospect for hydrocarbons in the subsurface region.

* * * * *